US008351544B2

(12) United States Patent
Mondal et al.

(10) Patent No.: US 8,351,544 B2
(45) Date of Patent: Jan. 8, 2013

(54) METHOD AND APPARATUS FOR CODEBOOK-BASED FEEDBACK IN A CLOSED LOOP WIRELESS COMMUNICATION SYSTEM

(75) Inventors: Bishwarup Mondal, Oak Park, IL (US); Amitabha Ghosh, Buffalo Grove, IL (US); Fan Wang, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1056 days.

(21) Appl. No.: 12/334,917

(22) Filed: Dec. 15, 2008

(65) Prior Publication Data
US 2010/0150266 A1 Jun. 17, 2010

(51) Int. Cl.
*H04L 27/00* (2006.01)
(52) U.S. Cl. ......... 375/299; 375/267; 375/347; 455/101
(58) Field of Classification Search .................. None
See application file for complete search history.

(56) References Cited

U.S. PATENT DOCUMENTS

| | | | |
|---|---|---|---|
| 6,859,503 B2 | 2/2005 | Pautler et al. | |
| 6,927,728 B2 | 8/2005 | Vook et al. | |
| 7,139,328 B2 | 11/2006 | Thomas et al. | |
| 7,310,537 B2 | 12/2007 | Wichman et al. | |
| 7,917,176 B2 * | 3/2011 | Khojastepour et al. | 455/562.1 |
| 2008/0225960 A1 * | 9/2008 | Kotecha et al. | 375/259 |
| 2008/0285667 A1 | 11/2008 | Mondal et al. | |
| 2008/0299917 A1 * | 12/2008 | Alexiou et al. | 455/103 |
| 2011/0142166 A1 * | 6/2011 | Kim et al. | 375/296 |

OTHER PUBLICATIONS

Love, David J. et al.: Limited Feedback Unitary Precoding for Spatial Multiplexing Systems, IEEE Transactions on Information Theory, vol. 51, No. 8, Aug. 2005, pp. 2967-2976.
Love, David J. et al.: Grassmannian Beamforming for Multiple-Input Multiple-Output Wireless Systems, IEEE Transactions on Information Theory, vol. 49, No. 10, Oct. 2003, pp. 2735-2747.
Klappenecker, Andreas et al.: Constructions of Mutually Unbiased Bases, arXiv:quant-ph/0309120v1, Sep. 15, 2003, pages all.
Hochwald, M. Bertrand et al.: Systematic Design of Unitary Space-Time Constellations, IEEE Transactions on Information Theory, vol. 46, No. 6, Sep. 2000, pp. 1962-1973.
3GPP TSG RAN WG1 #48, R1-070730, Precoding Codebook Design for 4 Node-B Antenna, Texas Instruments, St. Louis, Feb. 12-Feb. 16, 2007, pp. 1-8.

* cited by examiner

*Primary Examiner* — David C. Payne
*Assistant Examiner* — Adolf Dsouza

(57) ABSTRACT

A method and apparatus are provided for feedback for closed-loop transmitting with multiple transmit antenna elements and multiple receive antenna elements. A base station includes a codebook containing sets of weightings for the multiple transmit antenna elements, with each set of weightings identified by an index and the codebook known to the base station and a served mobile station (MS). The base station pre-codes pilot signals using a precoding matrix, preferably a unitary matrix, to produce pre-coded pilot signals, which precoding matrix may or may not be known to the MS and which precoding matrix may or may not be included in the codebook. The base station then transmits the pre-coded pilot signals to the MS via the multiple transmit antenna elements and, in response, receives an index to a set of weightings in the codebook for use in a subsequent transmission of a data stream.

12 Claims, 8 Drawing Sheets

METHOD AND APPARATUS FOR CODEBOOK-BASED FEEDBACK IN A CLOSED LOOP WIRELESS COMMUNICATION SYSTEM

FIELD OF THE INVENTION

The present invention relates generally to wireless communication systems, and in particular, to a method and apparatus for providing codebook-based feedback in a closed loop wireless communication system.

BACKGROUND OF THE INVENTION

Wireless communication system transmission methods have evolved to include multiple transmit antennas and multiple receive antennas in order to greatly increase the link capacity of wireless communication systems and/or to better focus the transmitted energy at the receiver for greater efficiency and less interference. An antenna array is a group of spaced apart antenna elements that each transmits an antenna signal that has a specific gain and phase relationship with the other antenna signals. When the antenna elements work together transmitting the antenna signals, they produce an antenna pattern that is more focused on the receiver than a pattern produced by a single antenna element. The process of changing the gain and phase of a signal to produce antenna signals may be referred to as "weighting" the signal using a set of "antenna array weights." Because antenna arrays may similarly be used at a receiver to improve signal quality, use of antenna arrays at both the transmitter and receiver has been proposed. When multiple antenna elements are used at each of the transmitter and receiver, the wireless channel between them may be referred to as a multiple-input, multiple-output (MIMO) channel. Determining how to feed signals to the multiple transmit antenna elements and receive signals from the multiple receive antenna elements becomes quite complicated.

Various transmission strategies require the transmit antenna array to have some level of knowledge concerning the channel response between each transmit antenna element and each receive antenna element and are often referred to as "closed-loop" MIMO. Obtaining full broadband channel knowledge at the transmitter is possible using techniques such as uplink sounding in Time Division Duplexing (TDD) systems and channel feedback in either TDD or Frequency Division Duplexing (FDD) systems. Limited feedback methods, such as fixed beam selection or codebook-based beamforming weight selection, can reduce the amount of feedback as opposed to full channel feedback, which would require a significant amount channel resources thereby reducing the link capacity.

Codebook-based beamforming weight selection involves selection, by a base station based on feedback from a mobile station, of a set of pre-coding matrices, that is, predetermined beamforming weights that are agreed upon between a transmitter and receiver. The weights are selected from a set, or codebook, of predetermined and agreed upon matrices of beamforming weights. Each matrix in the codebook can be identified by an index, and a mobile station identifies the weights to be applied by feeding back an index to a matrix and rank of the matrix. In this way, only an index and a rank need be used in feedback to the transmitter in order for the transmitter to know the proper weights to use.

In order to provide such feedback, a base station conveys a midamble, that is, a predetermined signal, to a mobile station (MS). The midamble is not weighted, that is, no beamforming weights are applied to the midamble prior to transmission to the MS. Based on the received midamble, the MS computes a channel response for the air interface between the mobile station and the base station and, based on the channel response, determines a matrix and rank of weights for application to downlink transmissions. However, existing codebooks are quite complex, with weights for each index comprising a matrix of a rank of up to the number of antenna elements (the rank means the number of data streams that are to be transmitted). Selecting, by an MS, a matrix and rank for application to downlink transmissions requires a number of involved calculations, which can include complex math including matrix multiplications. For example, for codebook feedback by an MS, computations scale by at least a factor $M_tN$ as the number of antenna elements increases, where $M_t$ is the number of transmit antenna elements at a base station and N is a number of indices in the codebook for each rank. For fixed beam selection, use of a precoded midamble reduces computational complexity but requires an increased midamble size, and correspondingly reduced downlink throughput, as compared to codebook techniques. That is, as a number of transmit antenna elements increases, midamble overhead scales as N for beam selection but as $M_t$ for codebook feedback. For example, for four transmit antenna elements $M_t=4$ and N=16, and for eight transmit antennas elements $M_t=8$ and N=64.

Therefore, there is a need for a method and apparatus of closed loop feedback that reduces the computational complexity of the searching required for determining a codebook index and rank to feedback to the base station and that will not increase downlink overhead over the current art.

Figure 1:
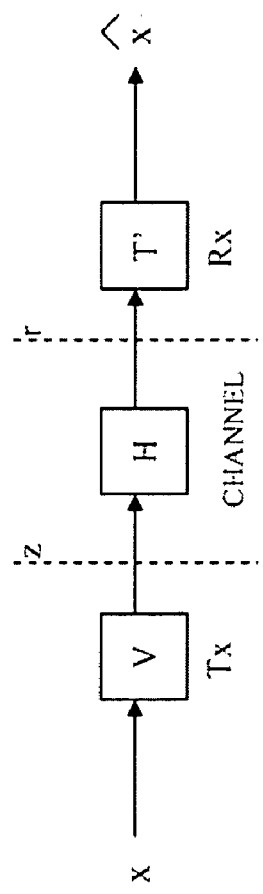
FIG. 1 is a high-level schematic diagram of a wireless communications channel in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus that provides closed loop feedback that reduces the computational complexity of the searching required for determining a codebook index and rank to feedback to a base station and that will not increase downlink overhead over the current art, a method and apparatus are provided for feedback for closed-loop transmitting with multiple transmit antenna elements and multiple receive antenna elements. A base station includes a codebook containing sets of weightings for the multiple transmit antenna elements, with each set of weightings identified by an index and the codebook known to the base station and a served mobile station (MS). The base station pre-codes pilot signals using a precoding matrix, preferably a unitary matrix, to produce pre-coded pilot signals, which precoding matrix may or may not be known to the MS and which precoding matrix may or may not be included in the codebook. The base station then transmits the pre-coded pilot signals to the MS via the multiple transmit antenna elements and, in response, receives an index to a set of weightings in the codebook for use in a subsequent transmission of a data stream.

Generally, an embodiment of the present invention encompasses a method for providing feedback for closed-loop transmitting with multiple transmit antenna elements and multiple receive antenna elements. The method includes providing a codebook containing sets of weightings for the multiple transmit antenna elements with each set of weightings identified by an index and the codebook known to a transmitter and a receiver, pre-coding pilot signals using a precoding matrix to produce pre-coded pilot signals, transmitting the pre-coded pilot signals to the receiver via the multiple transmit antenna elements, and in response to transmitting the pre-coded pilot signals, receiving at the transmitter an index to a set of weightings in the codebook for use in a subsequent transmission of a data stream.

Another embodiment of the present invention encompasses a method for providing feedback for closed-loop transmitting with multiple transmit antenna elements and multiple receive antenna elements. The method includes receiving pre-coded pilot signal determining effective channels for a subset of rank-1 codebook weightings to produce 'S' effective channels, and determining an effective channel for each remaining codebook weightings as a low complexity function of the 'S' effective channels.

Yet another embodiment of the present invention encompasses a base station that is capable of operating in a multiple input, multiple output communication system. The base station includes an antenna array comprising multiple antenna elements, a codebook containing sets of weightings for the multiple transmit antenna elements with each set of weightings identified by an index known to the base station and a mobile station serviced by the base station, an antenna array signal processor that pre-codes pilot signals using a matrix to produce pre-coded pilot signals that is transmitted via the plurality of transmit antenna elements, and a receiver that receives an index to a set of weightings in the codebook for use in a subsequent transmission of a data stream.

Still another embodiment of the present invention encompasses a mobile station that is capable of operating in a multiple input, multiple output communication system, the mobile station comprising multiple antenna elements and configured to receive a pre-coded pilot signal, based on the received pilot signal, determine an effective channel for a subset of rank-1 codebook weightings to produce 'S' effective channels, and determine an effective channel for each remaining codebook weightings as a function of the 'S' effective channels.

In the present invention, the communication system may utilize an Orthogonal Frequency Division Multiplexed (OFDM) or multicarrier based architecture including Adaptive Modulation and Coding (AMC). The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. However, alternate embodiments of the communication system may utilize other cellular communication system protocols such as, but not limited to, TDMA, direct sequence CDMA, cyclic prefix single carrier systems, interleaved frequency division multiple access systems.

The present invention may be more fully described with reference to FIGS. 1-9. FIG. 1 shows a high-level schematic diagram of a wireless communications channel. As shown, x represents user data that will be wirelessly transmitted to the receiver. At the receiver, x̂ represents an estimate of the data transmitted, x. User data x may be split in the transmitter to produce a vector that represents multiple data streams, $x_1$, $x_2$, ... $x_N$.

User data x is processed by a matrix V to produce adaptive array antenna signals z. Each column of matrix V is a vector containing an antenna array weight set used to transmit one of the data streams $x_i$. Signals z are wirelessly transmitted from antenna elements of a transmit antenna array, and received at a receiver antenna array as received antenna signals r. The air interface or channel between antenna signals z and received antenna signals r includes matrix H, which describes the effects of the air interface or channel on signals z. Received antenna signals r are processed in the receiver by matrix T' to produce the estimate of the data, x̂.

Figure 2:
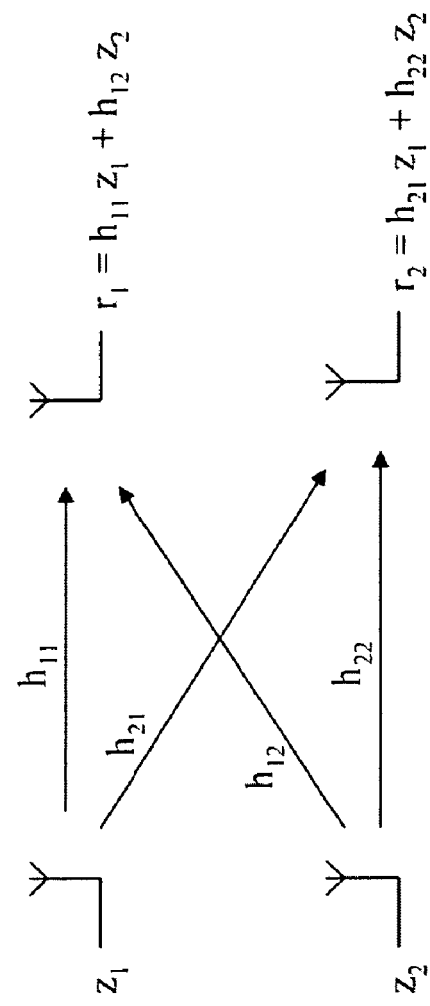
FIG. 2 is a high-level block diagram of a two-input, two-output MIMO channel in accordance with an embodiment of the present invention.

Referring now to FIG. 2, there is depicted a two-input, two-output MIMO (multiple input, multiple output) antenna array system, although it should be recognized that the present invention is not limited to a two antenna system and can be applied equally well to any number of transmit and receive antennas. This MIMO system in this example is used to simultaneously transmit two different data streams, $z_1$ and $z_2$, to a single mobile station through a "composite channel" H, defined by the matrix $$H = \begin{bmatrix} h_{11} & h_{12} \\ h_{21} & h_{22} \end{bmatrix}$$

where $h_{mn}$, m=1, 2, and n=1, 2, are complex channel values. Note that the term "composite channel" as used herein refers to a complete measurement or description of a channel, wherein the effects of all combinations of transmit antennas and receive antennas are considered. The composite channel may be thought of as the aggregation of all channels and precoding weights between arrays of antennas, defined by all pair-wise combinations of transmit and receive antennas.

When a flat Rayleigh fading channel is assumed, $h_{mn}$ are complex-valued Gaussian numbers with unity average power, $E[h_{mn}h^*_{mn}]=1$. The received (baseband) vector r (see FIG. 1) is ideally written as follows $$r = Hz = HVx$$

where $x=[x_1\ x_2]^T$ is the vector of transmitted data streams, and noise is not considered. Note that in a noise free channel, both streams can be recovered perfectly if channel matrix HV is full rank. That is, two equations and two unknowns can be solved to recover the unknowns $x=[x_1\ x_2]^T$. When $x=(HV)^{-1}r$, both data streams can be recovered and link, or channel, efficiency can be doubled.

Figure 3:
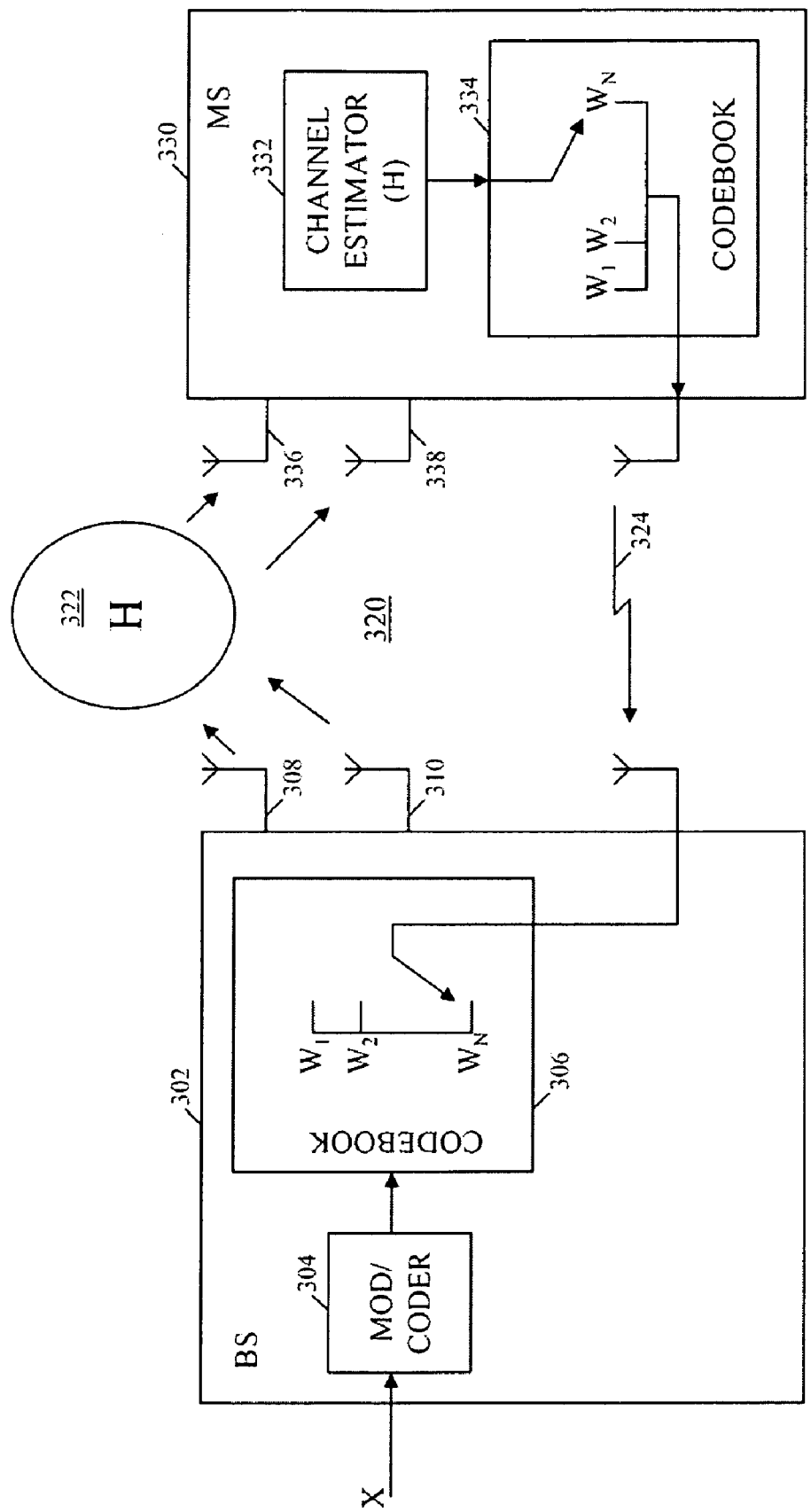
FIG. 3 is a block diagram of a wireless communication system that employs a multiple-stream, multiple-antenna (MIMO) wireless communication scheme in accordance with an embodiment of the present invention.

Referring now to FIG. 3, a block diagram is provided of a wireless communication system 300 in accordance with the present invention. Communication system 300 includes a base station (BS) 302 comprising a modulator and coding module 304, a codebook 306, and an antenna array comprising multiple antenna elements 308, 310 (two shown). Communication system 300 further includes a mobile station (MS) 330, such as but not limited to a cellular telephone, a radio telephone, a personal digital assistant (PDA) with radio frequency (RF) capabilities, or a wireless modem that provides RF access to digital terminal equipment (DTE) such as a laptop computer. MS 330 includes a channel estimator 332, a codebook 334, and an antenna array comprising multiple antenna elements 336, 338 (two shown). BS 302 and MS 330 communicate via an air interface 320 that includes a downlink comprising multiple downlink traffic and downlink control channels and an uplink comprising multiple uplink traffic and uplink control channels.

BS 302 transmits a measurement signal, that is, a midamble comprising precoded pilot signals, to MS 330 via multiple antennas 308, 310 and a downlink channel 322 of air interface 320. Based on the received version of the signal, channel estimator 332 of MS 330 estimates the composite downlink channel 322, that is, determines a frequency response H corresponding to the channel, and uses H to select a matrix from codebook 334, that is, to select one of matrices $W_1, W_2, \ldots, W_N$ included in the codebook.

MS 330 then conveys an indicator of the selected matrix, for example, an index to the matrices $(W_1, W_2, \ldots, W_N)$ of codebook 334, and a rank indicator, back to BS 302 via an uplink channel 324 of air interface 320. Matrices $(W_1, W_2, \ldots, W_N)$ of codebook 334 have corresponding matrices $(W_1, W_2, \ldots, W_N)$ in codebook 306. Based on the received matrix and rank indicators, BS 302 then selects the indicated matrix, and rank of the matrix, for assigning weights to each of the multiple antenna elements 308, 310 of the BS for a subsequent transmission to the MS. For purposes of the present invention, base station 302 also may be referred to herein as "the transmitter" and MS 330 also may be referred to herein as "the receiver" unless specifically mentioned otherwise.

Figure 4:
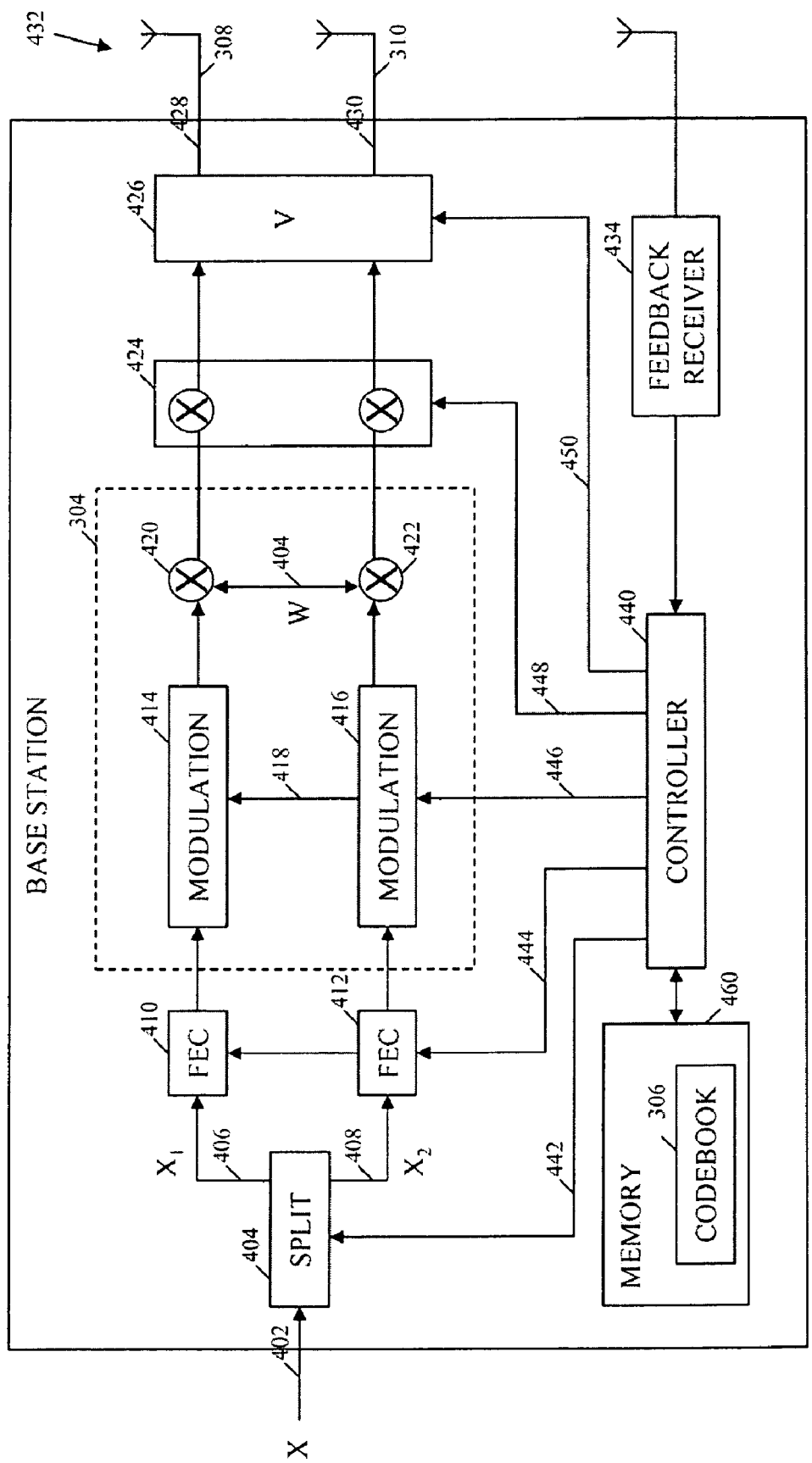
FIG. 4 is a block diagram of a multiple-stream, multiple-antenna base station of FIG. 3 in accordance with an embodiment of the present invention.

Referring now to FIG. 4, there is depicted a block diagram of base station 302 in accordance with an embodiment of the present invention. Base station 302 comprises a multiple-stream, multiple-antenna closed-loop transceiver that receives user data 402 and transmits the processed user data using an antenna array 432 that comprises the multiple antenna elements 308, 310.

User data 402 enters a data splitter 404, which separates the user data stream into a plurality of data streams, such as data stream 406 and data stream 408. While two data streams are shown in FIG. 4, data splitter 404 may produce any number of data streams. Data splitter 404 splits data 402 in proportion to a control signal 442, which is produced by a controller 440. For example, control signal 442 may specify a ratio of 2-to-1, wherein two bits are sent to data stream 406 and one bit is sent to data stream 408. This splitting ratio may specify an equal number of bits on both streams, or all data bits may be sent to one stream.

Data streams 406 and 408 output by data splitter 404 are input into multiple forward error correction encoders (FEC) 410 and 412. These error correction encoders may be implemented with a convolutional encoder, a turbo encoder, a block encoder, or the like. The type of encoding and the rate of encoding are controlled by a control signal 444, which is output by controller 440. Control signal 444 may set error correction encoders 410 and 412 to the same error encoding schemes or different encoding schemes.

Outputs of error correction encoders 410 and 412 are coupled to inputs of modulators 414 and 416. Modulators 414 and 416 may be implemented with linear or non-linear modulation schemes, including all varieties of modulators that modulate amplitude and phase, and combinations of amplitude and phase. Examples of modulators that may be used include Binary Phase Shift Keying modulators (BPSK), Quadrature Phase Shift Keying modulators (QPSK), M-ary phase shift keying modulators, M-ary quadrature amplitude modulators (MQAM), and the like.

Controller 440 further produces a control signal 446 that is used to select a type of modulation used in modulators 414 and 416. The modulation schemes in the data streams may be the same, or different. The output of modulators 414 and 416 are coupled to inputs of optional spreaders 420 and 422, respectively. Spreaders 420 and 422 each spreads the signal using a spreading code 418, such as a Walsh code, that is assigned to user data 402.

Outputs of optional spreaders 420 and 422 are coupled to inputs of a power allocator 424. Power allocator 424 sets a power ratio between data streams 406 and 408 in response to a control signal 448 from controller 440. Power allocator 424 may allocate all power to one data stream, equal powers on data streams, or other ratios of unequal power allocations.

Outputs of power allocator 424 are coupled to inputs of antenna array signal processor 426, which further processes the data streams by applying antenna array weight sets to each data stream. These antenna array weight sets come from controller 440 via a control signal 450. By applying the antenna array weight sets to data streams 406 and 408, antenna array signal processor 426 enables the transmission of each data stream with a different antenna array beamforming pattern.

The outputs of antenna array signal processor 426 include weighted components of the input data streams. For example, output 428 may include a phase-and-gain weighted portion of data stream 406 added together with a phase-and-gain weighted portion of data stream 408. The number of weighted outputs 428, 430 from antenna array signal processor 426 is equal to the number of transmit antennas 308, 310. While the number of outputs of antenna array signal processor 426 may be greater than the number of data streams input, the number of data streams transmitted remains the same.

Figure 5:
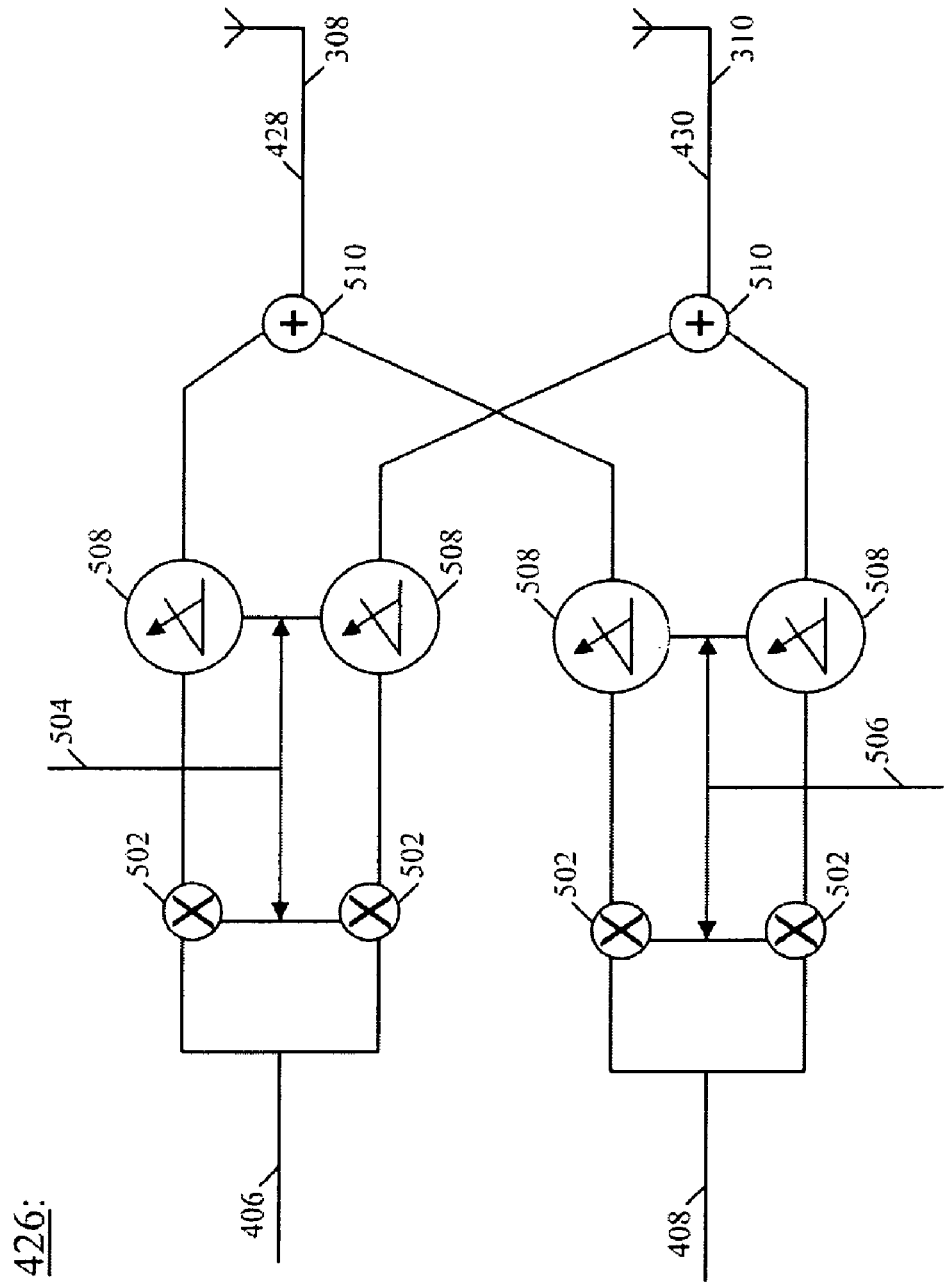
FIG. 5 is a block diagram of an antenna array signal processor of the base station of FIG. 4 in accordance with an embodiment of the present invention.

Referring now to FIG. 5, there is depicted a block diagram of antenna array signal processor 426 in accordance with an embodiment of the present invention. As shown, data streams 406 and 408 enter antenna array signal processor 426, wherein a copy of each data stream is sent to a gain multiplier corresponding to an antenna element that will be used in an antenna array. In the example shown in FIG. 5, two antennas will be used in the antenna array, therefore copies of each data stream are sent to two gain multipliers 502. Following each gain multiplier 502 is a phase shifter 508, which rotates the phase of the signal according to the control signal 450 received from controller 440. Outputs of phase shifters 508 are coupled to summers 510, which add the weighted data streams to produce output signals 428 and 430. Output signals 428 and 430 then may be up-converted, amplified, and coupled to the corresponding antenna elements 308, 310.

Control signal 450 includes multiple antenna array weight sets, wherein one antenna array weight set is associated with each data stream. For example, control signal 450 includes weight set signals 504 and 506. Weight set signal 504 includes gain and phase weights (that is, complex weights) for each gain multiplier 502 and phase shifter 508 associated with data stream 406. Thus, the outputs of phase shifters 508 associated with data stream 406 produce antenna signals that provide a selected antenna pattern for data stream 406. Similarly, weight set signal 506 includes phase and gain weights for each gain multiplier 502 and phase shifter 508 associated with data stream 408. In the outputs of phase shifters 508 associated with data stream 408 produce antenna signals for driving an antenna array with a selected pattern for data stream 408.

In order to produce desired antenna beamformed patterns for each data stream, gain multipliers 502 associated with a data stream may have different gain values and phase shifters 508 associated with a data stream may have different phase shift values, whereby producing antenna signals that work together to form a particular transmission pattern.

Controller 440 outputs control signals 442, 444, 446, 448, and 450 based upon information received from a feedback receiver 434 and data stored in a memory 460. Feedback receiver 434 is shown coupled to a separate antenna for receiving feedback data from a remote receiver, such as MS 330; however, one of ordinary skill in the art realizes that one of the antenna elements of antenna array 432 may be used to receive the feedback data. Feedback data from feedback receiver 434 includes a codebook index and may further include a rank index, as described below, which are used by controller 440 to lookup transmission weightings in codebook 306 pre-stored within memory 460. Controller 440 also may be used to calculate, or derive, additional control signals or transmission parameters based upon feedback data. Therefore, it should be understood that feedback data may include measurements upon which calculations may be based, or data that indicates parameters to be used by base station 302.

Figure 6:
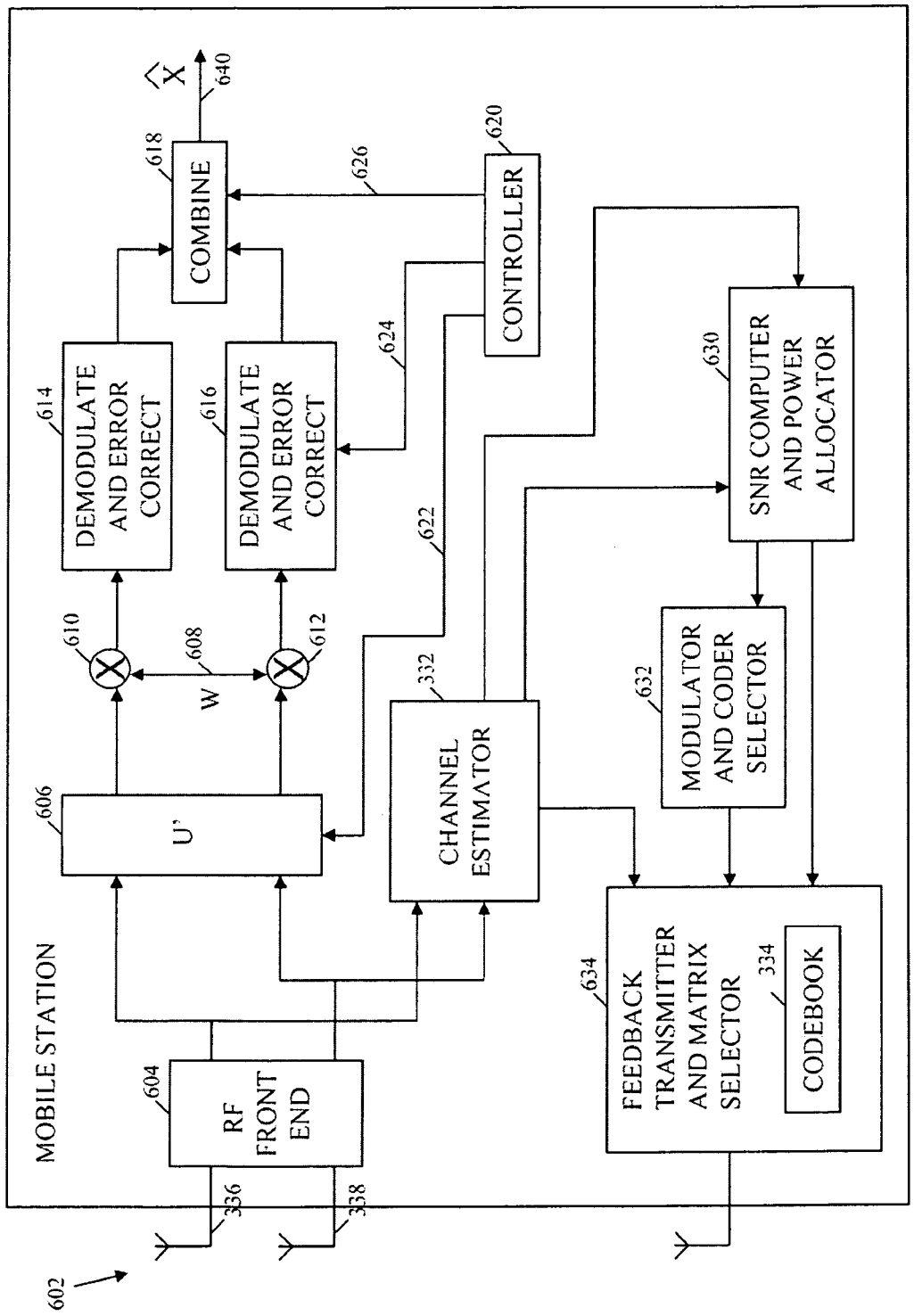
FIG. 6 is a block diagram of a multiple-stream, multiple-antenna mobile station of FIG. 3 in accordance with the method and system of the present invention.

Referring now to FIG. 6, there is depicted a block diagram of MS 330 for use in the multiple-stream, multiple-antenna transceiver system 300 in accordance with an embodiment of the present invention. MS 330 comprises a multiple-stream, multiple-antenna transceiver that includes an antenna array 602 having multiple antenna elements 336, 338 that receive radio frequency (RF) signals transmitted by base station 302. The received RF signals are most likely different signals because antenna elements 336, 338 are spaced apart, and propagation paths taken by received RF signals from antenna elements 308, 310 of base station 302 are most likely different in a multi-path fading environment.

In the multiple-stream, multiple-antenna transceiver system that is made up of base station 302 and MS 330, multiple data streams are transmitted to increase the data throughput between the base station and MS. Base station 302 is able to simultaneously transmit multiple data streams, and MS 330 is able to keep the multiple streams separate by exploiting the differences in the channel characteristics between the multiple antennas at the base station and MS. Thus, user data 402 in base station 302 is received by MS 330 and output as estimated user data 640.

The received RF signals are input into an RF receiver front end 604, wherein the RF signals are down converted and digitized. The output of RF receiver front end 604 is a stream of complex baseband digital samples that represent the received RF signals.

The outputs of RF receiver front end 604 are input into a receiver signal processor 606, which has the function of separating data streams 406 and 408 in MS 330. In one embodiment of the present invention, receiver signal processor 606 may be implemented by multiplying the input signals by the complex conjugate transpose of a unitary matrix T, which is the left singular vectors of the singular value decomposition of the composite channel matrix H. In another embodiment of the present invention, receiver signal processor 606 may be implemented by multiplying the input signals by the pseudo-inverse of the product of the composite channel matrix H with the matrix V. In yet another embodiment of the present invention, receiver signal processor 606 may be implemented by multiplying the input signals by MMSE combining weights calculated from the product of the composite channel matrix H with the matrix V. Receiver signal processor 606 is controlled by a control signal 622 from a controller 620.

The data streams output by receiver signal processor 606 are input to optional despreaders 610 and 612, which despread the signals using the same spreading code 608 used in base station 302. The outputs of despreaders 610 and 612 are coupled, respectively, to the inputs of demodulator and decoders 614 and 616. Each demodulator and decoder 614 and 616 demodulates the signal and decodes the signal using demodulation and error correction decoding techniques that correspond to those selected for each data stream in the transmitter.

The outputs from demodulator and decoders 614 and 616 are input into a combiner 618, which combines the multiple streams received back into a single stream for output as estimated user data 640. Combiner 618 operates under the control of controller 620, as directed by control signal 626. Because the received data streams may have different data rates, and because one data stream may have a data rate equal to zero, combiner 618 must reconstruct the user data in accordance with the way data was originally split by data splitter 404 in base station 302.

In order to control the transmission of multiple data streams via multiple antennas at base station 302, MS 330 must measure the composite channel and send feedback data to the base station. As shown, outputs of radio frequency front end 604 are also coupled to composite channel estimator 332, which uses the pilot signals transmitted from each antenna element 310, 312 in base station 302 to measure the composite channel between the multiple transmit antenna elements and the multiple receive antenna elements. In practice, MS 330 receives the downlink pilot signals and measures the downlink channel estimates from each of the base station's (transmit) antenna elements to each of the (receive) antenna elements 336, 338 of the MS.

The output of composite channel estimator 332, which is represented by the H matrix, is input into signal-to-noise ratio (SNR) computer and power allocator 630 and feedback transmitter 634. SNR computer and power allocator 630 computes an SNR for each data stream hypothetically transmitted. Based upon the SNR computations, the power allocation function of block 630 allocates power to each data stream.

Once power has been allocated to each data stream, final SNR calculations may be performed using the selected power allocation.

A modulator and coder 632 receives information from SNR computer and power allocator 630 and uses the information to select an encoding scheme and a modulation scheme to be used in base station 302. Generally, higher order modulators are selected for data streams having high signal-to-noise ratios.

Feedback transmitter 634 receives information from composite channel estimator 332, SNR computer and power allocator 632, and modulator and coder selector 630. This information represents calculations and selections made in MS 330 that will be used to control the transmission modes of base station 302. In a preferred embodiment, feedback transmitter 634 analyzes the data and selects a codebook value (index and rank) and associated transmitter parameters that most closely match the transmitter parameters represented by the input data. Therefore, feedback transmitter 634 includes, or is coupled to, a memory that stores a codebook 334 for producing a codebook index that is transmitted to base station 302 via one or more transmit antennas. Although the transmit antenna is shown separate from receive antenna array 602, the transmit antenna may be one of the antenna elements 308, 310 in antenna array 602. Data transmitted by feedback transmitter 634 is received in base station 302 by feedback receiver 434.

In an embodiment of the present invention, codebook-based feedback of channel information enables linear pre-coding (including beamforming) in MIMO systems, in a TDD or a FDD scenario. Base station 302 as well as MS 330 have prior knowledge of a fixed, predetermined set of pre-coding matrices, that is, a codebook. Base station 302 transmits a known signal precoded with a precoding matrix, that is, a midamble comprising precoded pilot signals, to MS 330. Based on the received precoded pilot signals, MS 330 estimates the downlink channel 322 and, based on the estimate, selects a particular codebook entry, that is, a codebook matrix and rank. An index of this entry is sent back to base station 302 using a low-rate feedback channel 324. In order to reduce the computational complexity necessary at MS 330 for choosing the codeword, the present invention provides for a pre-coding of the pilot signal that is received by, and measured by, MS 330 and used by the MS to select the codebook entry that is fed back to base station 302. Further, the pre-coding of the pilot signal is such that MS 330 does not need to be informed, in advance of receiving the midamble, of the particular matrix that is used to pre-code of the midamble in order for the pre-coding to be useful to the MS.

Figure 7:
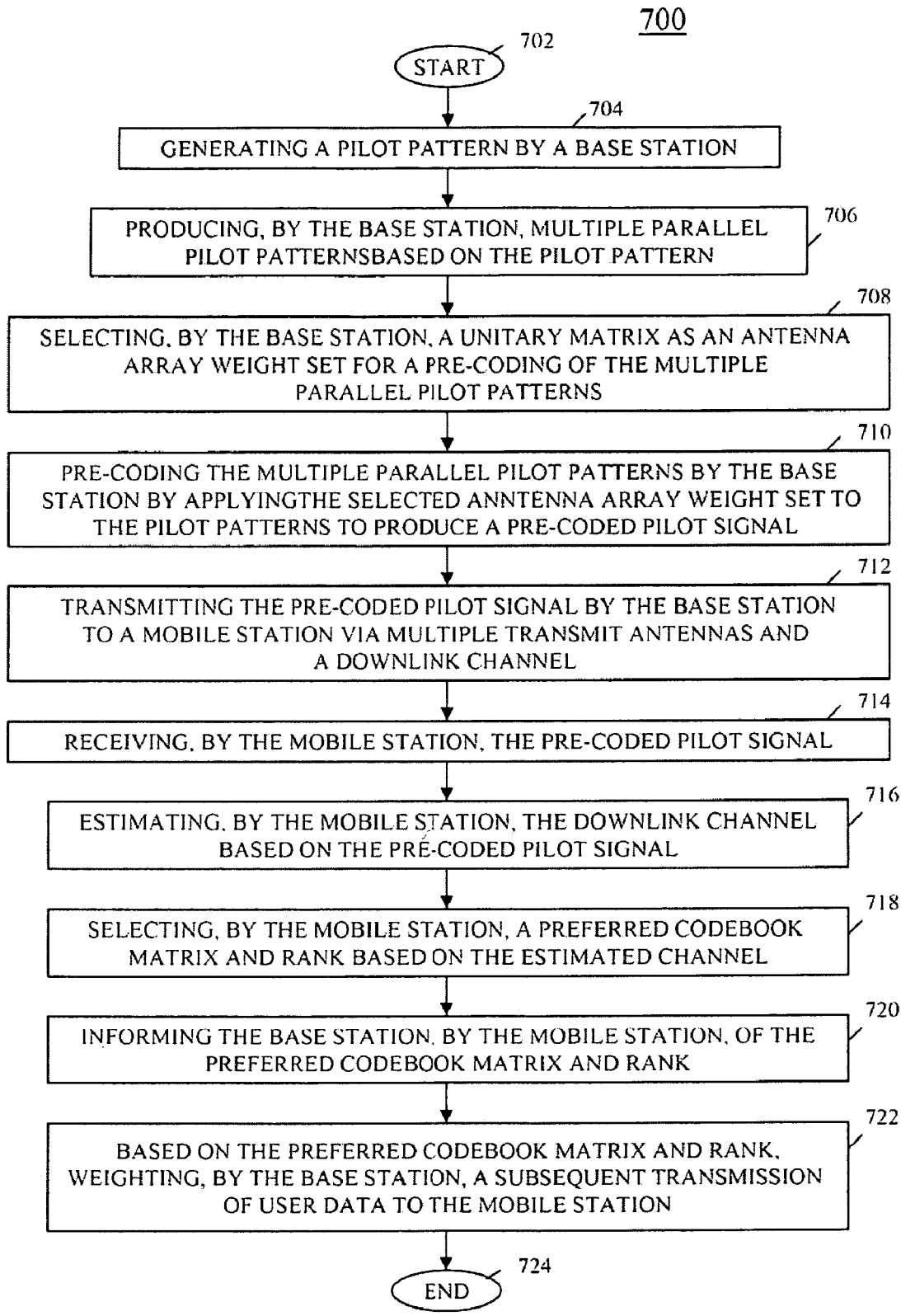
FIG. 7 is a logic flow diagram of method performed by the communication system of FIG. 3 for precoding of a pilot signal in accordance with an embodiment of the present invention.

Referring now to FIG. 7, a logic flow diagram 700 is provided for pre-coding of a pilot signal by communication system 300 in accordance with an embodiment of the present invention. Logic flow diagram 700 begins (702) when base station 302 generates (704) a predetermined codeword, preferably a pilot pattern, that is, a predetermined pattern of bits that is known to both the base station and MS 330 and that is used for channel estimation. As is known in the art, a pilot pattern is used as a training sequence for channel estimation, power measurements, and/or synchronization. Base station 302 applies the pilot pattern to splitter 404 to produce (706) multiple parallel pilot patterns and proceeds to process the pilot patterns in accordance with known techniques, as described above with respect to FIG. 4, to produce multiple parallel pilot patterns that are applied to the inputs of antenna array signal processor 426. Antenna array signal processor 426 then pre-codes (710) the multiple pilot patterns by applying antenna array weight sets to each pilot pattern of the multiple pilot patterns to produce a pre-coded pilot signal comprising multiple parallel, pre-coded multiple pilot patterns.

These antenna array weight sets come from controller 440 via a control signal 450; however, unlike transmitted user data where the weight sets are selected based on feedback from the MS, controller 440 may select (708) a unitary matrix for weighting, or pre-coding, of the pilot signal without the use of feedback from the MS. Any unitary matrix may be used; the unitary matrix may or may not be contained in the codebooks 306, 334 and base station 302 may arbitrarily determine the unitary matrix used to weight the predetermined codeword. Further, MS 330 may or may not know in advance, or be informed by the base station, of the particular unitary matrix selected by the base station. Base station 302 then transmits (712) the pre-coded pilot signal to MS 330 via the multiple antenna elements 308, 310 of antenna array 432 and downlink channel 322.

MS 330 receives (714) the pre-coded pilot signal via the multiple antenna elements 336, 338 of antenna array 602 and estimates (716) channel 322 based on the received pre-coded pilot signal. Based on the estimated channel, MS 330 then determines an effective channel for each of one or more matrices of codebook 334. MS 330 then selects (718) a preferred codebook matrix and rank for use by base station 302 in a subsequent transmission of user data based on the effective channel determinations, and in particular by choosing a preferred codebook matrix corresponding to the best effective channel. MS 330 then informs (720) base station 302 of the selected codebook matrix and rank, preferably by conveying a codebook index to the preferred codebook matrix, and a rank index, back to the base station. Base station 302 then uses (722) the selected codebook matrix and rank to weight a subsequent transmission of user data to MS 330, and logic flow diagram 700 then ends (724).

A brief description of codebook formation can now be described here. Assume that base station 302 has $M_t$ antennas, MS 330 has $M_r$ antennas, and that $M_s$ data-streams are to be transmitted by the base station to the MS. Let H(k) represent the $M_r \times M_t$ channel matrix for the k-th subcarrier in frequency. Let W represent a pre-coding matrix of dimension $M_t \times M_s$ which is an element of the codebook as defined herein (note that this W is different from the W 404, 608 used in spreaders 420 and 422 and despreaders 610 and 612). The criteria for selecting a codeword by a receiver is non-unique but usually the selection criteria involve multiplications of the form H(k)W.

A formula for selecting an element of a codebook by a receiver may be expressed as $$V = \operatorname*{argmax}_{W \in \Phi} \sum_{k=1}^{K} \|H(k)W\|_F^2$$

where the matrix norm is the Frobenius norm ($\|A\|_F^2$ means the sum of the squared magnitude of the entries of A), H(k) represents the $M_r \times M_t$ channel matrix for a k-th subcarrier in frequency, K denotes the size of the cluster consisting of K adjacent subcarriers, W is a precoding matrix of dimension $M_t \times M_s$, $\Phi = \{W_1, W_2, \ldots, W_N\}$ denotes the codebook of precoding matrices, and V is the selected element from $\Phi$ that represents the quantized precoding matrix for the cluster. The present invention provides for the construction of $\Phi$ from a set of unitary matrices.

A standard and fast way of evaluating codebooks is to compute the minimum pairwise distances of all the codewords. The distance measures used are summarized below.

$$d_{min,k} = \min_{W_i, W_j, i \neq j} \frac{1}{\sqrt{2}} \|W_i W_i^H - W_j W_j^H\|_F$$

where the subscript k denotes the number of streams (or rank). This distance is used for $1 \leq k < M_t$. The following distance is used for $k = M_t$.

$$d_{min,k} = \min_{W_i, W_j, i \neq j} \|W_i - W_j\|_F.$$

A codebook having a larger $d_{min,k}$ is considered to be better than a competitor codebook. The equivalence relations for certain selection criteria are as follows:

$$\arg\max_W \|HW\|_F^2 = \arg\max_W \|HW_\perp\|_F^2$$

$$\log_2 \det\left[I + \frac{E_s}{M_s N_0} W^H H^H H W\right] =$$

$$\log_2 \det\left[I + \frac{E_s}{M_s N_0} H^H H - \frac{E_s}{M_s N_0} H^H H W_\perp W_\perp^H\right]$$

$$\text{trace}\left[I + \frac{E_s}{M_s N_0} W^H H^H H W\right]^{-1} =$$

$$r - M_r + \text{trace}\left[I + \frac{E_s}{M_s N_0} H H^H - \frac{E_s}{M_s N_0} H W_\perp W_\perp^H H^H\right]^{-1}$$

where $w_\perp$ is of rank $(M_t - r)$ and denotes the orthogonal complement of w, where r denotes the rank or the number of streams (interchangeably denoted by $M_s$). Thus, in case a simple codebook exists for $w_\perp$ and not for w, it is beneficial to search over codebooks consisting of $w_\perp$. Note that other distances can be used. One such alternative is to use the square root of one minus minimum squared singular value of $W_1^H W_2$.

An index of the selected pre-coded set of weights is then sent back to the base station, whereupon the base station checks that index against the codebook stored in memory to select the indicated set of weights in subsequent transmissions. For a rank 'n' transmission, the base station uses the first n columns of selected matrices as the beamforming weights.

In order to facilitate the selection of a codebook matrix based on a unitary matrix that is used to pre-code the midamble, unitary matrices are used to construct codebooks 306 and 334, starting with a unitary matrix U that is used as a building block for the codebook. Unitary matrix U may be any unitary matrix; however, whatever matrix serves as U is used to precode the midamble.

For example, the following describes a scheme for codebook construction for four transmit (Tx) antenna elements using a unitary matrix U. This scheme then may be extended to a scheme for codebook construction for eight transmit antenna elements, and so on. For the four antenna element scheme, four unitary matrices, that is, A, B, C, D (corresponding to a codebook size of 16) are defined as:

$$A=U, B=UA_1, C=UA_2, D=UA_3 \quad (1)$$

where U can be an arbitrary 4×4 unitary matrix and matrices $A_1, A_2, A_3$ are defined in equations (2), (3) and (4).

$$A_1 = \left(\frac{1}{\sqrt{2}}\right)\begin{bmatrix} 0 & 1 & 0 & i \\ i & 0 & 1 & 0 \\ 0 & i & 0 & 1 \\ 1 & 0 & i & 0 \end{bmatrix} \quad (2)$$

$$A_2 = \left(\frac{1}{\sqrt{2}}\right)\begin{bmatrix} 0 & 1 & 0 & i \\ 0 & i & 0 & 1 \\ i & 0 & 1 & 0 \\ 1 & 0 & i & 0 \end{bmatrix} \quad (3)$$

$$A_3 = \left(\frac{1}{\sqrt{2}}\right)\begin{bmatrix} 0 & 1 & 0 & i \\ i & 0 & 1 & 0 \\ 1 & 0 & i & 0 \\ 0 & i & 0 & 1 \end{bmatrix} \quad (4)$$

Note that matrices $A_1$, $A_2$ and $A_3$ have only two non-zero entries (1 or i) in each column. So the columns of matrices B, C and D are linear combinations of two columns of U. From matrices A, B, C, D, a codebook Φ of cardinality 16 may be constructed, that is, $\Phi = \{A_0, A_1, A_2, A_3, B_0, B_1, B_2, B_3, C_0, C_1, C_2, C_3, D_0, D_1, D_2, D_3\}$, where $A_j$ represents matrix A with the columns shifted circularly to the left by j places. The codebook Φ is designed as a common codebook for rank-1, rank-2, rank-3 and rank-4 precoding matrices. In the case of rank-1, the first column of each of the matrices constitute a codebook, in the case of rank-2 the first two columns of each matrix constitute the codebook and so on. The distance properties of such a codebook are given in Table 1:

TABLE 1

Distance metric comparison for 4Tx size 16 codebook

| | Rank-1 | Rank-2 | Rank-3 | Rank-4 |
|---|---|---|---|---|
| MUB | 0.8660 | 1.0 | 0.8660 | 1.4142 |
| LTE | 0.7071 | 1.0 | 0.7071 | 1.4142 |
| Proposed Invention | 0.7071 | 1.0 | 0.7071 | 1.0824 | where MUB refers to codebook design pursuant to an article by B. Mondal, T. A. Thomas, M. Harrison, "Rank Independent Codebook Design from a Quaternary Alphabet", presented at the IEEE Asilomar Conference on Signals, Systems, and Computers, pg. 297-301, Pacific Grove, Calif., USA, Nov. 4-7, 2007, and LTE refers to codebook design pursuant to the Third Generation Partnership Long Term Evolution (3GPP LTE) standards. In simulations depicted in FIG. 8, the 4×4 unitary matrix U was chosen to be:

$$U = \left(\frac{1+i}{2\sqrt{2}}\right)\begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (5)$$

In the case of eight transmit (Tx) antennas (that is, $M_t = 8$), eight unitary matrices A, B, C, D, E, F, G, H can be defined as:

$$A=U, B=UA_1, C=UA_2, D=UA_3, E=UA_4, F=UA_5,$$
$$G=UA_6, H=UA_7 \quad (6)$$

where U is an arbitrary 8×8 unitary matrix and matrices $A_1, \ldots, A_7$ are defined in equations (7)-(13) below.

The matrices $A_1, \ldots, A_7$ defined in equations (7)-(13) and the matrices $A_1, A_2, A_3$ as defined in equations (2), (3) and (4) are non-unique and there exist multiple choices for such matrices with the property that the entries are limited to a restricted alphabet. Restricted alphabet refers to an alphabet that consists of 0 and integer powers of i (sqrt(−1)) or half integer powers of i. Restricted alphabet also refers to an alphabet that consists of integer powers of i (sqrt(−1)) or half integer powers of i. In one embodiment, the alphabets comprise the values {0, 1, −1, i, −i, (1+i)/sqrt(2), (1−i)/sqrt(2), (−1+i)/sqrt(2), (−1−i)/sqrt(2)} where sqrt(2) means the square root of 2. One may note that, in this example, the set contains 0 and the following integer and half integer powers of i: {0, 2, 1, 3, ½, 7/2, 3/2, and 5/2}. In another embodiment, the alphabets comprise the values {0, 1, −1, i, −i}. In yet another embodiment, the alphabets comprise the values {1, −1, i, −i}. In still another embodiment, the alphabets comprise the values {1, −1, i, −i, (1+i)/sqrt(2), (1−i)/sqrt(2), (−1+i)/sqrt(2), (−1−i)/sqrt(2)}. It may also be noted that the matrices $A_1$, $A_2$, $A_3$ may be scaled by a constant factor.

$$A_1 = \left(\frac{1}{\sqrt{2}}\right)\begin{bmatrix} 0 & 0 & 0 & i & 0 & 0 & 0 & 1 \\ 0 & 0 & 1 & 0 & 0 & 0 & i & 0 \\ 0 & i & 0 & 0 & 0 & 1 & 0 & 0 \\ 1 & 0 & 0 & 0 & i & 0 & 0 & 0 \\ 0 & 0 & 0 & 1 & 0 & 0 & 0 & i \\ 0 & 0 & i & 0 & 0 & 0 & 1 & 0 \\ 0 & 1 & 0 & 0 & 0 & i & 0 & 0 \\ i & 0 & 0 & 0 & 1 & 0 & 0 & 0 \end{bmatrix} \quad (7)$$

$$A_2 = \left(\frac{1}{\sqrt{2}}\right)\begin{bmatrix} 0 & 0 & 0 & i & 0 & 0 & 0 & 1 \\ 0 & 0 & 1 & 0 & 0 & 0 & i & 0 \\ 0 & i & 0 & 0 & 0 & 1 & 0 & 0 \\ 1 & 0 & 0 & 0 & i & 0 & 0 & 0 \\ i & 0 & 0 & 0 & 1 & 0 & 0 & 0 \\ 0 & 1 & 0 & 0 & 0 & i & 0 & 0 \\ 0 & 0 & i & 0 & 0 & 0 & 1 & 0 \\ 0 & 0 & 0 & 1 & 0 & 0 & 0 & i \end{bmatrix} \quad (8)$$

$$A_3 = \left(\frac{1}{\sqrt{2}}\right)\begin{bmatrix} 0 & 0 & 0 & i & 0 & 0 & 0 & 1 \\ 0 & 0 & 0 & 1 & 0 & 0 & 0 & i \\ 0 & 0 & 1 & 0 & 0 & 0 & i & 0 \\ 0 & 0 & i & 0 & 0 & 0 & 1 & 0 \\ 0 & i & 0 & 0 & 0 & 1 & 0 & 0 \\ 0 & 1 & 0 & 0 & 0 & i & 0 & 0 \\ 1 & 0 & 0 & 0 & i & 0 & 0 & 0 \\ i & 0 & 0 & 0 & 1 & 0 & 0 & 0 \end{bmatrix} \quad (9)$$

$$A_4 = \left(\frac{1}{\sqrt{2}}\right)\begin{bmatrix} 0 & 0 & 0 & i & 0 & 0 & 0 & 1 \\ 0 & 0 & 1 & 0 & 0 & 0 & i & 0 \\ 0 & 0 & 0 & 1 & 0 & 0 & 0 & i \\ 0 & 0 & i & 0 & 0 & 0 & 1 & 0 \\ 0 & i & 0 & 0 & 0 & 1 & 0 & 0 \\ 1 & 0 & 0 & 0 & i & 0 & 0 & 0 \\ 0 & 1 & 0 & 0 & 0 & i & 0 & 0 \\ i & 0 & 0 & 0 & 1 & 0 & 0 & 0 \end{bmatrix} \quad (10)$$

$$A_5 = \left(\frac{1}{\sqrt{2}}\right)\begin{bmatrix} 0 & 0 & 0 & i & 0 & 0 & 0 & 1 \\ 0 & 0 & 1 & 0 & 0 & 0 & i & 0 \\ 0 & 0 & i & 0 & 0 & 0 & 1 & 0 \\ 0 & 0 & 0 & 1 & 0 & 0 & 0 & i \\ 0 & i & 0 & 0 & 0 & 1 & 0 & 0 \\ 1 & 0 & 0 & 0 & i & 0 & 0 & 0 \\ i & 0 & 0 & 0 & 1 & 0 & 0 & 0 \\ 0 & 1 & 0 & 0 & 0 & i & 0 & 0 \end{bmatrix} \quad (11)$$

$$A_6 = \left(\frac{1}{\sqrt{2}}\right)\begin{bmatrix} 0 & 0 & 1 & 0 & 0 & 0 & i & 0 \\ 0 & 0 & 0 & i & 0 & 0 & 0 & 1 \\ 1 & 0 & 0 & 0 & i & 0 & 0 & 0 \\ 0 & i & 0 & 0 & 0 & 1 & 0 & 0 \\ 0 & 0 & 0 & 1 & 0 & 0 & 0 & i \\ 0 & 0 & i & 0 & 0 & 0 & 1 & 0 \\ 0 & 1 & 0 & 0 & 0 & i & 0 & 0 \\ i & 0 & 0 & 0 & 1 & 0 & 0 & 0 \end{bmatrix} \quad (12)$$

$$A_7 = \left(\frac{1}{\sqrt{2}}\right)\begin{bmatrix} 0 & i & 0 & 0 & 0 & 1 & 0 & 0 \\ 1 & 0 & 0 & 0 & i & 0 & 0 & 0 \\ 0 & 0 & 0 & i & 0 & 0 & 0 & 1 \\ 0 & 0 & 1 & 0 & 0 & 0 & i & 0 \\ 0 & 0 & 0 & 1 & 0 & 0 & 0 & i \\ 0 & 0 & i & 0 & 0 & 0 & 1 & 0 \\ 0 & 1 & 0 & 0 & 0 & i & 0 & 0 \\ i & 0 & 0 & 0 & 1 & 0 & 0 & 0 \end{bmatrix} \quad (13)$$

Thus a 64 element eight dimensional codebook $\Psi$ may then be constructed similarly to the four dimensional codebook described above by circularly shifting the columns of these eight matrices, that is, $\Psi = \{A_0, \ldots, A_7, B_0, \ldots, B_7, C_0, \ldots, C_7, D_0, \ldots, D_7, E_0, \ldots, E_7, F_0, \ldots, F_7, G_0, \ldots, G_7, H_0, \ldots, H_7\}$. In the case of rank-1, the first column of each of the matrices constitute a codebook, in the case of rank-2 the first two columns of each matrix constitute the codebook and so on. The distance properties of such a codebook are given in Table 2:

TABLE 2

Distance metric comparison for 8Tx size 64 codebook

| | Rank-1 | Rank-2 | Rank-3 | Rank-4 |
|---|---|---|---|---|
| MUB | 0.9354 | 1.0 | 1.0 | 1.0 |
| Proposed Invention | 0.7071 | 1.0 | 1.0 | 1.0 |

Figure 8:
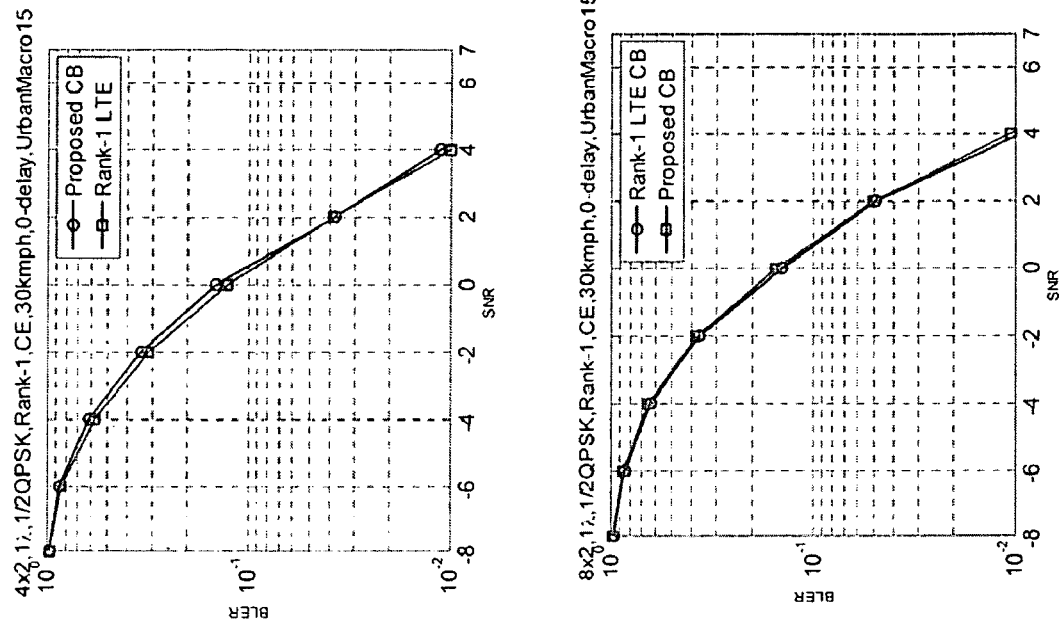
FIG. 8 is a graphical representation of error rate results in accordance with the present invention compared to the prior art.

FIG. 8 shows error rate results from simulations comparing the performances of various codebooks. The results show that the unitary matrix-based codebooks described herein have very similar error rate performance as the LTE codebooks.

In the simulations, the 8×8 unitary matrix U was chosen to be:

$$U = \left(\frac{1+i}{4}\right)\begin{bmatrix} 1 & 1 & 1 & 1 & 1 & 1 & 1 & 1 \\ 1 & -1 & 1 & 1 & -1 & 1 & -1 & -1 \\ 1 & 1 & 1 & -1 & 1 & -1 & -1 & -1 \\ 1 & 1 & -1 & 1 & -1 & -1 & -1 & 1 \\ 1 & -1 & 1 & -1 & -1 & -1 & 1 & 1 \\ 1 & 1 & -1 & -1 & -1 & 1 & 1 & -1 \\ 1 & -1 & -1 & -1 & 1 & 1 & -1 & 1 \\ 1 & -1 & -1 & 1 & 1 & -1 & 1 & -1 \end{bmatrix} \quad (14)$$

The use of the above described codebook design and precoding of a pilot pattern using the unitary matrix U can enable two types of feedback strategies—(i) conventional codebook-based feedback strategy based on midamble or broadcast pilots, and (ii) mix of beam selection and codebook feedback.

Figure 9:
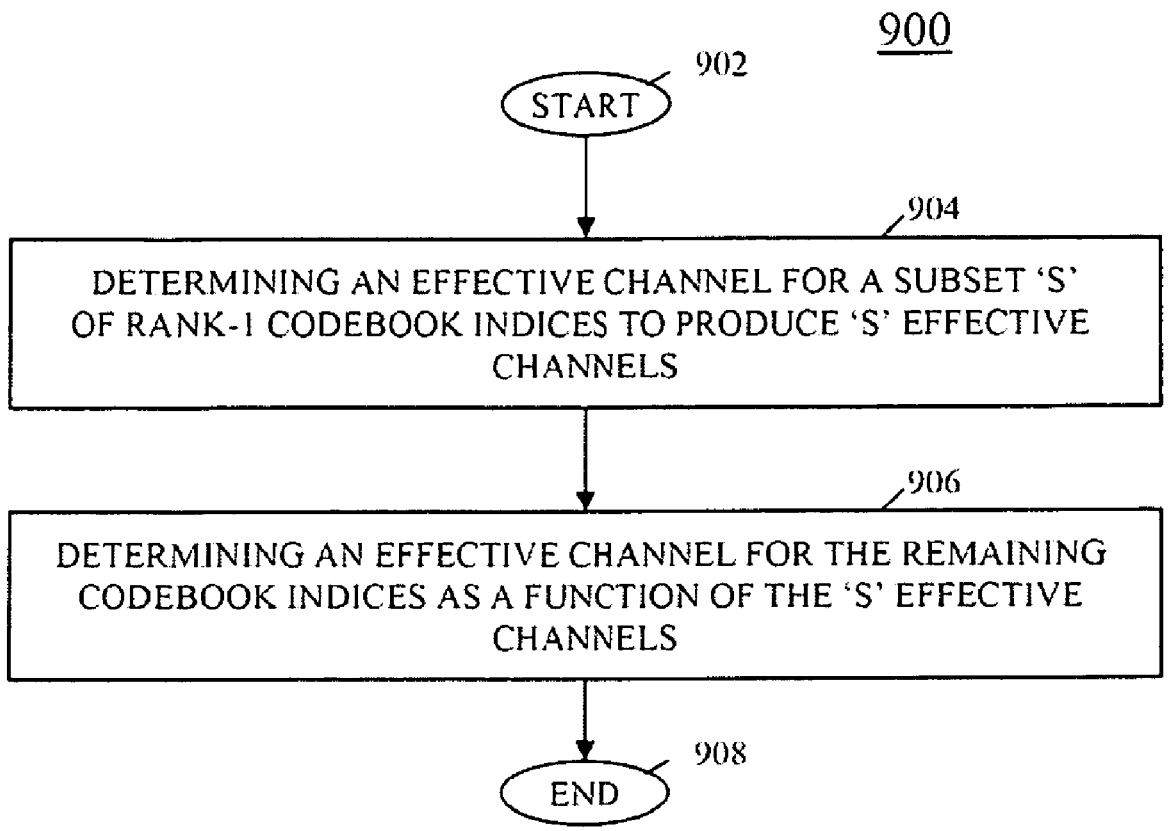
FIG. 9 is a logic flow diagram that illustrates a method performed by the mobile station of FIG. 3 in determining an effective channel for one or more matrices of a codebook in accordance with an embodiment of the present invention.

Referring now to FIGS. 7 and 9, a logic flow diagram 900 is provided that illustrates a method performed by MS 330 in determining an effective channel for the matrices of codebook 334 in accordance with an embodiment of the present invention. Let codebooks $\Phi$ and $\Psi$ have 8-PSK entries. Logic flow diagram 900 then begins (902) when MS 330 determines (904) an effective channel for a subset 'S' of rank-1 codebook indices to produce 'S' effective channels. That is, assume w to be a rank-1 codeword chosen from a codebook and H to be a $M_r \times M_t$ channel matrix, where $M_t$ is the number of transmit antenna elements (that is, at base station 302) and $M_r$ is the number of receive antenna elements (that is, at MS 330). Then the computation for Hw can be considered as a basic unit of computation.

MS 330 then determines (906) an effective channel for the remaining codebook indices as a function of the 'S' effective channels. That is, codebook $\Phi$ has 16 unique vectors and $\Psi$ has 64 unique vectors for all ranks. Once the rank-1 Hw computations are performed for all the indices there is no need for any additional Hw computations for the remaining ranks. The codebook search for $\Phi$ and $\Psi$ then can be simplified by ordering the computations. For codebook $\Phi$, assume that the Hw computations are completed for the first 4 indices (all the columns of U). Each of the Hw computations for the remaining 12 indices can be obtained by a complex addition using the Hw results obtained for the first 4 indices. In the case of codebook $\Psi$, after the computations for the first 8 indices are completed, each of the Hw computations for the remaining 56 indices can be obtained by a complex addition using the Hw results obtained for the first 8 indices. Logic flow diagram 900 then ends (908). This mode of feedback may provide modest gains in computation compared to the LTE codebook in the case of four Tx antennas; however, in the case of eight Tx antennas the computational savings will be significant.

For a strategy with a mix of beam selection and codebook feedback, the pilots for the midamble may be precoded by a unitary matrix U that is determined by base station 302. Then, the Hw computations for the first 4 indices of $\Phi$ and the first 8 indices of $\Psi$ can be eliminated because they are multiplied by the downlink channel naturally. This would also mean that U need not be standardized or known by MS 330. As a result, U can be controlled by base station 302 and set according to antenna polarizations or long-term antenna correlations, or randomized between cell sites and the codebook is no longer restricted to an 8-PSK alphabet. This mode of operation will also provide maximum savings in terms of computation.

In one embodiment of the invention a base station, such as base station 302, may employ a precoding matrix U to modify the codebook that is already built into mobile stations, such as MS 330, as necessitated by the standard specifications. This precoding matrix U may be optimized to improve the cell throughput by matching the modified codebook to a particular antenna configuration at the base station or multi-path fading environment or traffic type or to reduce interference. The choice of U may change with time or frequency or both.

In another embodiment of the invention, multiple base stations or multiple sectors may coordinate the choice of the precoding matrix U that is used by each base station, such as base station 302, or sector to precode the mid-amble. The choice of U may be optimized to minimize inter-cell or inter-sector interference.

In yet another embodiment of the invention, an MS, such as MS 330, may estimate the interference from the precoded mid-amble (or precoded pilots) received from a non-serving base station. This estimate may be used by the MS to feed back a codebook index to a serving base station, such as base station 302.

In still another embodiment of the invention, an MS, such as MS 330, may estimate the interference from the precoded midamble (or precoded pilots) received from a serving base station, such as base station 302. The MS then may use this interference estimate to determined, and feed back, a codebook index to the serving base station.

Thus the present invention provides for a less computationally intensive scheme of codebook-based feedback of channel information, enabling linear pre-coding (including beam-forming) in MIMO systems, in a TDD or a FDD scenario. Base station 302 transmits a known signal, precoded with a precoding matrix, that is, a midamble comprising precoded pilot signals, to MS 330. Based on the received precoded pilot signals, MS 330 estimates the downlink channel 322 and, based on the estimate, selects a particular codebook entry, that is, a codebook matrix and rank. An index of this entry is sent back to base station 302 using a low-rate feedback channel 324. In order to reduce the computational complexity necessary at MS 330 for choosing the codeword, the present invention provides for a pre-coding of the pilot signal that is received by, and measured by, MS 330 and used by the MS to select the codebook entry that is fed back to base station 302. Further, the pre-coding of the pilot signal is such that MS 330 does not need to be informed, in advance of receiving the midamble, of the particular matrix that is used to pre-code of the midamble in order for the pre-coding to be useful to the MS.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing feedback for closed-loop transmitting with a plurality of transmit antenna elements and a plurality of receive antenna elements, the method comprising:
    providing a codebook containing sets of weightings for the plurality of transmit antenna elements with each set of weightings identified by an index and the codebook known to a transmitter and a receiver;
    pre-coding pilot signals using a precoding matrix to produce pre-coded pilot signals;
    transmitting the pre-coded pilot signals to the receiver via the plurality of transmit antenna elements; and
    in response to transmitting the pre-coded pilot signals, receiving at the transmitter an index to a set of weightings in the codebook for use in a subsequent transmission of a data stream, wherein the pre-coding pilot signals comprises pre-coding pilot signals using a unitary matrix and further, wherein the receiver is not informed, by the transmitter, of the unitary matrix used to pre-code the pilot pattern.

2. The method of claim 1, further comprising:
    receiving the pre-coded pilot signals;
    estimating a composite channel between the plurality of transmit antenna elements and the plurality of receive antenna elements based on the received pre-coded pilot signals;
    selecting a set of weightings based on the composite channel estimates; and
    feeding back an index of the set of weightings to a transmitter associated with the plurality of transmit antenna elements for use in a subsequent transmission of a data stream.

3. The method of claim 1, wherein the codebook weights are restricted to a finite alphabet.

4. The method of claim 1, wherein the same codebook is used for all ranks

5. A method for providing feedback for closed-loop transmitting with a plurality of transmit antenna elements and a plurality of receive antenna elements, the method comprising:
    receiving pre-coded pilot signals;
    determining effective channels for a subset of rank-1 codebook weightings to produce 'S' effective channels; and
    determining an effective channel for each remaining codebook weightings as a low complexity function of the 'S' effective channels.

6. The method of claim 5, further comprising:
    selecting a set of weightings based on the determined effective channels; and
    feeding back an index of the set of weightings to a transmitter associated with the plurality of transmit antenna elements for use in a subsequent transmission of a data stream.

7. A base station capable of operating in a multiple input, multiple output communication system, the base station comprising:
    an antenna array comprising plurality of antenna elements;
    a codebook containing sets of weightings for the plurality of transmit antenna elements with each set of weightings identified by an index known to the base station and a mobile station serviced by the base station;
    an antenna array signal processor that pre-codes pilot signals using a matrix to produce pre-coded pilot signals that is transmitted via the plurality of transmit antenna elements; and
    a receiver that receives an index to a set of weightings in the codebook for use in a subsequent transmission of a data stream, wherein the antenna array signal processor pre-codes the pilot signals using a unitary matrix and further, wherein the mobile station is not informed, by the base station, of the unitary matrix used to pre-code the pilot pattern.

8. The base station of claim 7, wherein the codebook weights are restricted to a finite alphabet.

9. The base station of claim 7, wherein the same codebook is used for all ranks

10. A system comprising the base station of claim 7, and further comprising a mobile station having a plurality of antenna elements and that is configured to receive the pre-coded pilot signal, estimate a composite channel between the plurality of transmit antenna elements and the plurality of receive antenna elements based on the received pre-coded pilot signal, selecting a set of weightings for each data stream based on the composite channel estimate, and feed back an index of the set of weightings to a transmitter associated with the plurality of transmit antenna elements for use in subsequent transmissions of a data stream.

11. A mobile station capable of operating in a multiple input, multiple output communication system, the mobile station comprising a plurality of antenna elements and configured to receive a pre-coded pilot signal, based on the received pilot signal, determine an effective channel for a subset of rank-1 codebook weightings to produce 'S' effective channels, and determine an effective channel for each remaining codebook weightings as a function of the 'S' effective channels.

12. The mobile station of claim 11, wherein the mobile station is further configured to select a set of weightings based on the determined effective channels and feed back an index of the set of weightings to a transmitter for use in a subsequent transmission of a data stream.

* * * * *